(12) United States Patent
Dzuban et al.

(10) Patent No.: US 11,457,313 B2
(45) Date of Patent: Sep. 27, 2022

(54) ACOUSTIC AND VISUAL ENHANCEMENT METHODS FOR TRAINING AND LEARNING

(71) Applicant: Society of Cable Telecommunications Engineers, Inc., Exton, PA (US)

(72) Inventors: Mark Dzuban, Elverson, PA (US); Christopher Bastian, Glenmoore, PA (US); Margaret Bernroth, Gulph Mills, PA (US)

(73) Assignee: SOCIETY OF CABLE TELECOMMUNICATIONS ENGINEERS, INC., Exton, PA (US)

( * ) Notice: Subject to any disclaimer, the term of this patent is extended or adjusted under 35 U.S.C. 154(b) by 0 days.

(21) Appl. No.: 16/560,552

(22) Filed: Sep. 4, 2019

(65) Prior Publication Data

US 2020/0084543 A1    Mar. 12, 2020

Related U.S. Application Data

(60) Provisional application No. 62/728,557, filed on Sep. 7, 2018.

(51) Int. Cl.
*H04R 3/04* (2006.01)
*G09B 5/06* (2006.01)

(52) U.S. Cl.
CPC ........... *H04R 3/04* (2013.01); *G09B 5/06* (2013.01); *H04R 2430/01* (2013.01)

(58) Field of Classification Search
CPC ........ H04R 3/04; H04R 3/00; H04R 2430/01; H04R 2499/13; G09B 5/06; H03G 9/02; H03G 9/025; H03G 5/165; H03G 5/025; H03G 5/005; H03G 5/04; H03G 5/10; H03G 5/00; H03G 5/06; H04S 7/307; H04S 7/301

USPC .................. 381/98, 101, 102, 103
See application file for complete search history.

(56) References Cited

U.S. PATENT DOCUMENTS

| | | | |
|---|---|---|---|
| 3,836,717 A * | 9/1974 | Gagnon | G10L 19/00 704/265 |
| 5,813,862 A * | 9/1998 | Merzenich | G09B 5/065 434/185 |
| 5,924,069 A | 7/1999 | Kowalkowski | |
| 9,626,875 B2 | 4/2017 | Gal et al. | |
| 2005/0111628 A1 | 5/2005 | Beamon | |
| 2007/0054249 A1 * | 3/2007 | Wade | G09B 5/06 434/236 |

(Continued)

OTHER PUBLICATIONS

"Auditory Frequencies: Why High and Low Frequencies Affect Behavior, Emotions, Speech and Language", https://ilslearningcorner.com/2016-09-energy-ears-high-low-frequencies-affect-behavior-emotions-speech-language/.

(Continued)

*Primary Examiner* — Ahmad F. Matar
*Assistant Examiner* — Sabrina Diaz
(74) *Attorney, Agent, or Firm* — Volpe Koenig

(57) ABSTRACT

An enhancement method for learning is defined by a combination of intelligent application acoustic signals and filters to enhance learning. Data from a training database can be used to modify the enhancement to a pre-recorded audio presentation portion of the learning materials. The method preferably optimizes the learning materials based on the profile of the learner and includes audio or video enhancements to improve retention of the learning material.

20 Claims, 3 Drawing Sheets

(56) References Cited

U.S. PATENT DOCUMENTS

| | | |
|---|---|---|
| 2008/0249825 A1 | 10/2008 | Kunjar |
| 2010/0013847 A1 | 1/2010 | Shin |
| 2013/0143183 A1* | 6/2013 | Zilberman ............. G09B 19/08 434/157 |
| 2013/0177883 A1* | 7/2013 | Barnehama .............. G09B 7/00 434/236 |
| 2015/0016632 A1* | 1/2015 | Hillis ................... H04R 25/353 381/98 |
| 2016/0063883 A1* | 3/2016 | Jeyanandarajan ....... G09B 5/06 434/201 |
| 2018/0032943 A1 | 2/2018 | Howard et al. |
| 2018/0053430 A1 | 2/2018 | Dzuban et al. |

OTHER PUBLICATIONS

"Energy through our Ears: Why High and Low Frequencies Affect Behavior, Emotions, Speech and Language", https://ilslearningcorner.com/2016-09-energy-ears-high-low-frequencies-affect-behavior-emotions-speech-language/.

"Why computer voices are mostly female", https://www.cnn.com/2011/10/21/tech/innovation/female-computer-voices/index.html.

"Fetuses respond to father's voice but prefer mother's voice after birth" https://www.ncbi.nlm.nih.gov/pubmed/23817883.

Sasisekharan, R. et al. Proactive network maintenance using machine learning. IEEE in Houston. LOBECOM '93. IEEE Global Telecommunications Conference, including a Communications Theory Mini-Conference. Technical Program Conference Record (Cat. No. 93CH3250-8): 217-22 vol. 1 ;4 vol. (xxxix+2021+xvi+148). IEEE. (1993).

* cited by examiner

ACOUSTIC AND VISUAL ENHANCEMENT METHODS FOR TRAINING AND LEARNING

CROSS REFERENCE TO RELATED APPLICATION

The present application claims the benefit of the filing date of U.S. Provisional Application No. 62/728,557, filed Sep. 7, 2018, said application being herein incorporated by reference.

FIELD OF THE INVENTION

The present disclosure relates to training and development of individuals within any given workforce or industry that is categorized needing skilled workers with in-depth knowledge and to create measurable business results. The invention optimizes training and professional development of skilled workers performing multifaceted, complicated and varied tasks.

SUMMARY OF THE INVENTION

A method of acoustic enhancement of learning is provided for customizing various educational materials and in particular those including a sound or audio presentation. The audio presentation may accompany a visual presentation and may further include an interactive interface for receiving and evaluating user response(s). The method may enhance an individual learner's experience and may be utilized for a variety of individuals to increase recall and brain engagement. In one preferred form, the method modulates acoustic parameters of frequency, tones, and uses subliminal priming methods that may be customized based on the profile of the learner. Signal processing may include applying acoustic filters, generating tones of varying frequency, mixing in rhythms and/or music to affect learner's limbic systems. In addition, video enhancements may be applied to pre-recorded training courses to prime recall of learned materials.

A method of learning enhancement is contemplated for individuals, such as employees or the like. The method preferably includes the individual selecting educational materials having a recorded audio presentation. Stored biographical information regarding the individual is accessed for adjusting the presentation. The audio presentation is process by generating frequency enhancements thereto, with those enhancements associated with the stored information for individual. The audio processing step may further apply a signal processing band-pass acoustic filter to adjust the audio within a set frequency range to enhance the output of the audio presentation for the individual and to enhance the individual's cognitive function.

The contemplated method may further include a band-pass filter to enhance the audio presentation within the range of about 3000 Hz-4000 Hz. Further, the audio processing may include signal processing band-stop filter to enhance the output of the audio presentation within a set frequency range. The band-stop filter would preferably limit the portion of the audio presentation that is outside of the range of about 3000 Hz-4000 Hz.

The method may further apply an analytics optimization engine to determine an appropriate equalized audio frequency and volume level for the individual. The adjustment of the presentation may be dynamic and may be responsive to input by the individual during review of the learning material or based on the stored biographical information.

Further, the processing of the audio presentation may dynamically equalize the audio presentation for the individual.

The method may further include the application of distortion to the audio presentation for improving learning concentration and efficacy. The method may still further introduce acoustic enhancements in both high and low frequencies along with repetitive rhythms in the frequency range of about 3000 Hz-4000 Hz to affect cognitive functions. Further, acoustic priming factors and subliminal messages may be introduced to the audio presentation to enhance recall of learning materials. The method may be applied to audio presentations that are combined with visual presentations. The visual presentations may include video, virtual, or other visual forms.

Other features of the present invention and combinations of features will become apparent from the detailed description to follow, taken in conjunction with the accompanying drawings.

BRIEF DESCRIPTION OF THE DRAWINGS

For the purpose of illustration, the drawings show one or more forms that are presently preferred. It should be understood that the disclosure and claimed invention is not limited to the precise arrangements and instrumentalities shown in the drawings.

DETAILED DESCRIPTION

Figure 1:
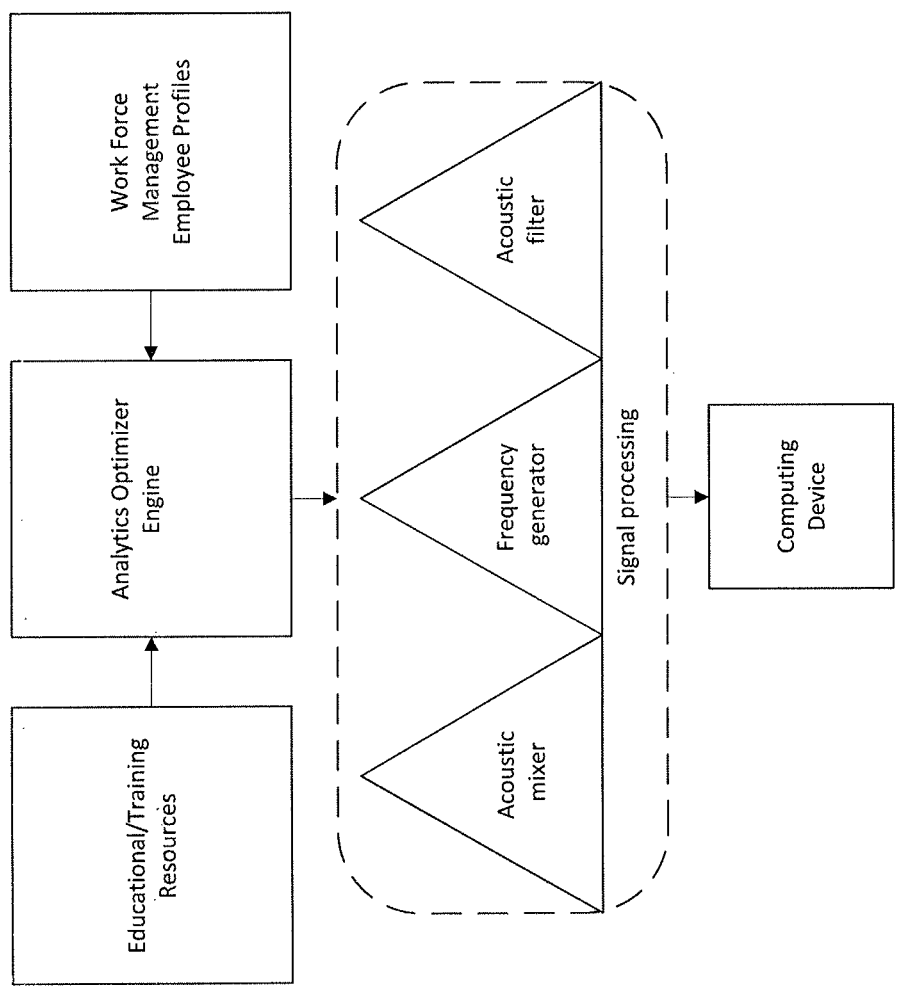
FIG. 1 shows various exemplary functions within the method contemplated by the present invention, wherein training resources, together with an individual's profile, are used to optimize a specific training course or presentation material.

The method contemplated by the present disclosure employs the study of psychoacoustics for the purpose of enhancing training and development of craft-based skills of individuals. Psychoacoustics has long enjoyed a symbiotic relationship with computer science, computer engineering, telecommunications networking and software development. The overall method provides an enhanced environment for individual learners.

In the 1930's the researchers Fletcher and Munson were the first people to measure and publish a set of curves showing the human ear's sensitivity to loudness compared to frequency. The curves show that the ear is most sensitive to sounds generally in the range of about 3,000-4,000 Hz. Sounds having frequencies above and below the 3,000-4,000 Hz range must be somewhat louder iii order to be perceived as equally loud. Consequently, when individuals hear frequencies around 3,500 Hz they will be 10 to 20 dB louder than other frequencies. The current method modulates frequencies to within the preferred range of 3,000-4,000 Hz.

Acoustic filters enhancing audio in the range from about 3000 Hz to around 4000 Hz will serve to positively affect cognitive functions such as thinking, spatial perception and memory to increase student's attentiveness and concentration.

A voice tract of a female is typically shorter than that of the typical male, which causes sharp and clear presentation in females. Scientific studies have shown that people generally find women's voices more pleasing than men's voices. See "Why computer voices are mostly female", https://www.cnn.com/2011/10/21/tech/innovation/female-computer-voices/index.html and "Fetuses respond to father's voice but prefer mother's voice after birth" https://www.ncbi.nlm.nih.gov/pubmed/23817883. Perhaps the most quoted person concerning this matter is Stanford University Professor and human-computer interaction expert Clifford Nass. He once said, "It's a well-established phenomenon that the human brain is developed to like female voices." According to Nass, preference for the female voice starts when we are mere fetuses taking in sounds from inside the womb. The fetuses showed no distinct reaction to their father's voice, however. The method preferably employs a women's voice for the audio portion of educational materials to increase an individual's attention to the material. Preferably, recorded educational materials will use a relatively deep female voice to affect listenability. The method may further apply fricative acoustics and voice frequency modulation to the audio files to enhance learning.

It is a little known function of the ear to transform stimuli from our environment into energy. The ear is a generator for the nervous system and brain See "Auditory Frequencies: Why High and Low Frequencies Affect Behavior, Emotions, Speech and Language", https://ilslearningcorner.com/2016-09-energy-ears-high-low-frequencies-affect-behavior-emotions-speech-language/. See also "Energy that Comes Through our Ears (Listening for Wellness)", Sollier, 2005. The vestibule, a part of the ear that contributes to hearing, not only listens to signals and sends them to the brain, but it also transforms body movements into energy. The vestibule uses movement to send energy to the brain. It also works with the cochlea to convert sound into energy. High frequencies are food for the brain. They energize it, stimulate it, make it alert and enable it to focus and remember. See "Listening for Wellness: An Introduction to the Tomatis Method", Mozart Center Press, 2015. See also "The Ear and the Voice." Scarecrow Press. pp. 141-. ISBN 978-0-8108-5137-5, 2004.

Low frequency sounds are sometimes used to manipulate (or brainwash) listeners. For example, major speeches given during World War 2 came after repetitive drumming, intended to put listeners into a hypnotic trance. As such, variation in the types and frequency of sounds may be used to obtain an appropriate amount of energy to enhance learning and retention. An example of a good balance in acoustic stimulus is a military march, which mix low frequency sounds (the drums) make soldiers want to move but also can be tiring, and high frequency sounds (the trumpets) stimulate the brain and give it energy so the soldiers can march longer. See, for example, "Energy through our Ears: Why High and Low Frequencies Affect Behavior, Emotions, Speech and Language", https://ilslearningcornercom/2016-09-energy-ears-high-low-frequencies-affect-behavior-emotions-speech-language/.

Analysis and enhancement of craft-based skills is discussed in U.S. application Ser. No. 15/657,126, filed Jul. 27, 2017, and published as US 2018/0032943 A1 on Feb. 1, 2018. The subject matter of this prior application may be combined with the present disclosure. Further enhancements to the training and development of craft-based skills is disclosed in U.S. application Ser. No. 15/681,569, filed Aug. 21, 2017 and published as US 2018/0053430 A1 on Feb. 22, 2018. The subject matter of this further application may also be combined with the present disclosure. These prior applications are herein incorporated by reference.

In the drawings, there is shown one or more examples of achieving learning enhancement. FIG. 1 depicts various functions wherein training resources are applied together with an individual learner's, such as an employee's, profile to optimize learning materials to the specific individual or educational course. Signal processing is used to generate filters or to enhance the audio presentation of the training course material. This filtering and enhancement is geared toward the individual learner or subject matter presented.

The signal processing may include a band-pass filter that operates to permit sound to pass only in a set frequency range. In addition, or separately, a band-stop filter or band-reject filter may be utilized such that sound in a set frequency range is attenuated. Other signal processing acoustic filters may be used, such as audio filters, electronic filters, digital filters, mechanical filters, distributed element filters, waveguide filters, crystal filters, optical filters and more. The enhancement method is not necessarily limited to the technologies used. Moreover, the addition of stimulating sounds, at designated frequencies or rhythms, such as music, may be added to educational materials to energize the brain and nervous system of the learner.

Figure 2:
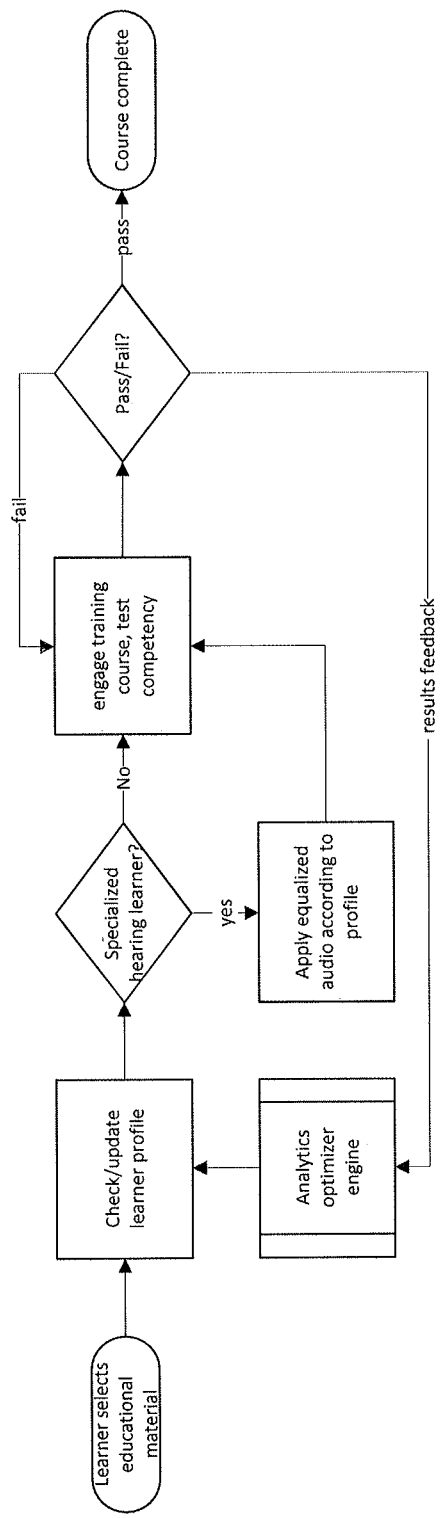
FIG. 2 shows an example of steps taken when an individual selects educational material that is then enhanced by the contemplated method.

FIG. 2 represents a flow chart whereby an individual selects desired educational material(s) that are then enhanced by the contemplated method. The individual's profile is checked and an analytics engine provides instructions to equalize audio frequencies, etc. according to an optimization algorithm. In the example shown, if the learner is hearing impaired or over the age of 55, the method adjusts frequencies of audible equipment (telephones, computer speakers) for hearing disabled or older listeners to the optimal ranges within the 3,000-4,000 Hz. It may also tune the information to slower (more than 10 ms) voice onset to enhance intelligibility. Hence, the educational material is customized and enhanced for the hearing ability of an individual. Additionally, visual and audible material are optimized for those learners with dyslexia. Competency results may be fed to the analytics optimization engine and may further refine the learner profile for future presentations and training.

Figure 3:
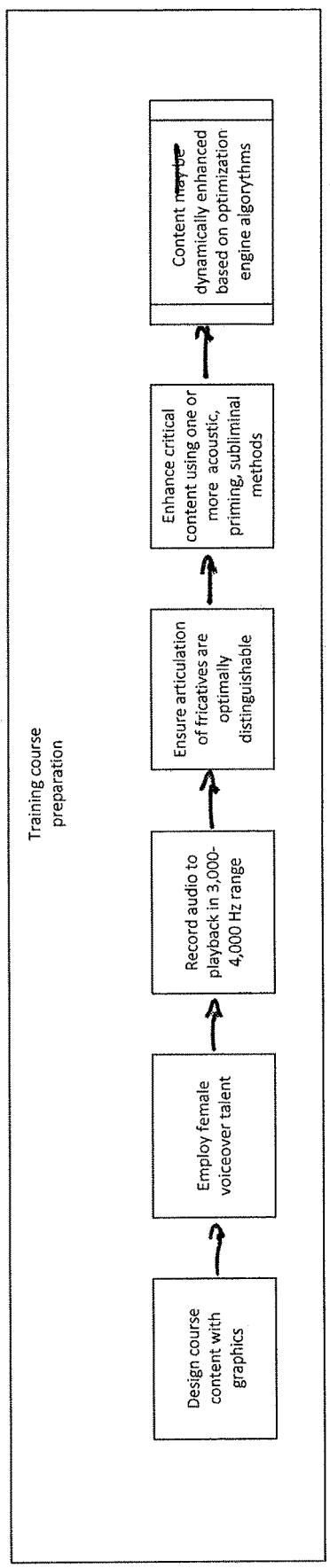
FIG. 3 shows various considerations when designing educational materials and training courses using the contemplated method.

FIG. 3 shows various considerations when designing educational materials and training courses. Lively graphics, virtual reality interface, female voiceover, audio frequency, articulation and priming critical course content for safety and recall in the field are employed. Some of the content is enhanced based on the learning optimization engine.

The manner of articulation, the spectrum of frequencies of sound or other signals with time or other variables can be used to identify spoken words in the audio range. The information that humans require to distinguish between speech sounds can be represented purely quantitatively by specifying peaks in the amplitude/frequency spectrum.

Young and older adults can learn to rapidly discriminate between elementary visual and auditory features. Age-related differences in neural activity during learning suggest that neural networks supporting behavioral improvements in speech segregation and identification change during the course of aging. The method shall facilitate the development of training programs that may help older listeners to parse the auditory scene into component sound sources. Compared with younger participants, older adults with and without hearing loss had more difficulty discriminating 10 millisecond voice onset time contrasts. Some of the speech understanding difficulties expressed by elderly adults may be related to impaired temporal precision in the aging auditory system. This might explain why older adults frequently complain that wearing a hearing aid makes speech louder but does not necessarily improve their ability to understand speech. Our ability to hear high frequencies declines with age. By the age of 55, some men cannot hear above 5,000 Hz and some women cannot hear above 12,000 Hz. The method adjusts frequencies of audible equipment (telephones, computer speakers) for older listeners. Aging and age-related hearing loss alter temporal response properties in the central auditory system. Because both older groups had difficulty discriminating these same speech stimuli, we conclude that some of the perceptual difficulties described by older adults might be due to age-related changes regulating excitatory and inhibitory processes. Likewise, perceptual differences between individuals with hearing disabilities may also be ameliorated via the method by adjusting the frequencies, slowing voice onset of the content or directly interfacing with a cochlear implant to enhance auditory processing.

Priming is a non-conscious form of human memory concerned with perceptual identification of words and objects. It refers to activating visual representations or associations in memory just before carrying out an action or task. For example, a person who sees the word (or color) "yellow" will be slightly faster to recognize the word "banana." This happens because yellow and banana are closely associated in memory. Additionally, priming can also refer to a technique in psychology used to train a person's memory in both positive and negative ways.

The amygdala is an area of the brain that processes memories and creates emotional reactions. The amygdala is part of the limbic system. The limbic system supports a variety of functions, including emotion, behavior, motivation, long-term memory, and our sense of smell. The scientists believe that the amygdala processes sound information from the auditory nerve in such a way as to provoke a negative reaction to certain sounds. Priming sounds and/or graphics induce critical recall or actions in urgent situations. For example, a plane's control panel alert sounds at a specific frequency "stall, stall . . ." in conjunction with a red graphic icon appearing on the control panel. The sound effects and graphics enhance recall in the learner to engage in the critical or safety-related activity especially when the learner has a hearing impairment or learning disability such as dyslexia. The sound effects and graphics may be presented via a virtual reality or by using a portable or fixed computing device.

Visual enhancements accompany an audio presentation may include, for example, enlarged fonts and graphics, which may be selectively added for visually impaired learners. The type and form of visual impairment may be designated within an individual's stored biographical information of other input during the presentation. The visual presentation portion of the education materials may include virtual reality and/or 3-dimensional renderings. The presentation, including its outcome, may also vary according to the individual's responses made during the presentation. Preferably, the warning or decisional conditions within the presentation may be consistent for similar presentation decisions or input. For example, flashing signals may be utilized in the visual portion of the material, and may be accompanied by a specific audio signal. The brightness or the size of the visual signal or stimuli may vary over time, along with the volume of any accompanying audio signal. Further, spectrograms may be used to visualize speech formants and to optimize the transmission of sound.

As noted, specific sound processing may be added to the presentation for a variety of purposes. For example, a reduction in the amplitude of the audio, such as for older or hearing impaired learners may be added. Again, these variations may be introduced for a set purpose or be responsive to the biographical information associated with the individual learner. A combination of low and high frequencies together may be introduced to calm, to improve attention and focus or to enhance retention of information. Examples of these combinations include adding a background rhythm or melody to a presentation, whether having been pre-recorded or prepared anew. Pleasing sounds may be added to the recorded audio to provoke a reaction in the limbic system of the learners' brain, for example, applause, thunder, water flowing, etc. In the alternative, unpleasant sounds may be added to various locations within an audio recording to provoke or stimulate learning by creating an intuitive reaction. For example, a squealing alarm, when a dangerous condition or responsive error, may be included.

As noted, the enhancement of the audio and visual presentation may be dynamic, responding to a number of conditions or stimuli. An algorithm may be applied to the presentation as part of the optimizing engine for the dynamic response. For example, the audio portion of the presentation may be subjected to an equalizer to adjust the audio frequency, volume, or the addition or filtering of background sound. The audio presentation would be run through an optimizer, with during preparation of the presentation or subsequently, in the case of existing (re-recorded) material. The optimizer could add higher frequency sounds/music during long lessons to increase attentiveness and concentration r adjust the frequency range and volume. Dynamic optimization may also be applied while an individual is reviewing the educational material. Audio compression codecs using a psychoacoustic model may also be used to increase/decrease compression ratios and to emit frequencies for cognitive stimulation and priming. Audio filters applied according to biographical information of individual may further be applied to increase/decrease frequency bands to "tune" content for the specific individual. Variation of the visual enhancements may further be applied by the optimizer according to the biographical information of the individual. Further, the optimizer may respond to aggregated learning results or other forms of feedback and become part of the stored biographical information. The learning results or score may further be used by a course planner or teacher in determining future educational exercises and presentations, both for an individual or for a group of individuals.

The present invention has been described and illustrated with respect to one or more exemplary embodiments. It should be understood by those skilled in the art from the foregoing that various other changes, omissions and additions may be made therein, without departing from the spirit and scope of the present invention, with the scope of the invention being described by the foregoing claims.

We claim:

1. A method implemented by a computing device, the computing device comprising a computer interface and a signal processor operatively coupled to the computer interface, wherein the signal processor comprises an acoustic mixer, a frequency generator, and an acoustic filter, wherein the computing device is configured to enhance learning for an individual, the method comprising:
   receiving a selection of educational materials for presentation to the individual through the computer interface, the educational materials including a recorded audio presentation and a visual presentation, wherein the recorded audio presentation includes a voice over;
accessing stored biographical information regarding the individual; and
modifying the audio presentation and the visual presentation prior to presenting the educational materials to the individual based on the stored biographical information for the individual, wherein the modifying the audio presentation is performed by the signal processor, wherein the modifying the audio presentation comprises applying fricative acoustics and voice frequency modulation, wherein the modifying the audio presentation comprises applying signal processing including a band-pass acoustic filter within a set frequency range to tailor the audio presentation to cognitive functions of the individual, and wherein the band-pass acoustic filter enhances the audio presentation within the range of about 3000 Hz-4000 Hz.

2. The method of learning enhancement of claim 1, wherein the computer interface includes a virtual reality interface.

3. The method of learning enhancement of claim 1, wherein the modifying the audio presentation comprises applying signal processing including a band-stop filter to tailor the audio presentation within a set frequency range to the individual's cognitive functions.

4. The method of learning enhancement of claim 3, wherein the band-stop filter limits the audio presentation outside of the range of about 3000 Hz-4000 Hz.

5. The method of learning enhancement of claim 1, further comprising:
modifying, dynamically, audio frequency and volume levels of the audio presentation based on an analytics optimization engine based on input from the individual.

6. The method of learning enhancement of claim 1, wherein modifying the audio presentation comprises applying distortion to the audio presentation to improve learning concentration and efficacy.

7. The method of learning enhancement of claim 1, wherein modifying the audio presentation comprises applying acoustic enhancements in both high and low frequencies along with repetitive rhythms to the audio presentation in a frequency range of about 3000 Hz-4000 Hz.

8. The method of learning enhancement of claim 1, wherein modifying the audio presentation comprises adjusting the frequency of the audio presentation based on the age of the individual.

9. The method of learning enhancement of claim 1, wherein modifying the audio presentation comprises introducing background rhythms and melodies into the audio presentation to enhance retention of the educational materials by the individual.

10. The method of learning enhancement of claim 1, wherein modifying the audio presentation comprises introducing audio stimuli into the presentation to provoke reaction from the individual to selective portions of the educational materials.

11. The method of learning enhancement of claim 1, wherein modifying the audio presentation comprises introducing acoustic priming factors and subliminal messages to the audio presentation to enhance recall of learning materials by the individual.

12. The method of learning enhancement of claim 1, wherein modifying the audio presentation comprises introducing acoustic priming factors and subliminal messages within both of the audio presentation and the visual presentation.

13. The method of learning enhancement of claim 1, wherein modifying the visual presentation comprises applying graphical enhancements to the visual presentation.

14. The method of learning enhancement of claim 13, wherein modifying the visual presentation comprises enhancements selected from the group consisting of font enlargement, graphical enlargement, flashing signals, brightness adjustments, contrast adjustments and visual stimuli.

15. The method of learning enhancement of claim 1, further comprising sending the modified audio presentation to a cochlear implant of the individual.

16. The method of learning enhancement of claim 1, wherein the computer interface includes a virtual reality interface, wherein the modified visual presentation is sent to the virtual reality interface.

17. The method of learning enhancement of claim 1, wherein modifying the audio presentation comprises adding additional sounds including rhythms or melodies.

18. The method of learning enhancement of claim 1, further comprising:
receiving feedback from the individual through the computer interface;
storing the feedback with the biographical information to create updated biographical information; and
dynamically updating the modifying of the audio presentation and the visual presentation based on the updated biographical information.

19. The method of learning enhancement of claim 1, wherein the modification to the audio presentation and the visual presentation are functionally linked.

20. A computing device, the computing device comprising a signal processor operatively coupled to a computer interface, wherein the signal processor comprises an acoustic mixer, a frequency generator, and an acoustic filter, wherein the computing device is configured to:
present educational materials to an individual, the educational materials including an audio presentation and a visual presentation, wherein the educational materials include an interactive element;
access stored biographical information regarding the individual;
receiving feedback from the individual through the computer interface in response to the interactive element; and
modifying the audio presentation and the visual presentation prior to presenting the education materials based on the stored biographical information and the feedback,
wherein modifying the audio presentation comprises:
applying a signal processing band-pass acoustic filter within a set frequency range, wherein the band-pass acoustic filter enhances the audio presentation within the range of 3000 Hz-4000 Hz;
adjusting the frequency of the audio presentation based on the age of the individual;
altering the volume levels of the audio presentation;
adding additional sounds including rhythms and melodies to the audio presentation;
adding music to the audio presentation;
altering a speed of playback of the audio presentation;
applying fricative acoustics of the audio presentation; and
modulating voice frequencies of a voice over of the audio presentation;
wherein modifying the visual presentation comprises:

altering fonts and font sizes of the visual presentation;

flashing elements of the visual presentation; and altering colors of the visual presentation.

* * * * *